US012336603B2

(12) United States Patent
Richerzhagen et al.

(10) Patent No.: US 12,336,603 B2
(45) Date of Patent: Jun. 24, 2025

(54) METHOD FOR CORING AND SLICING A CVD DIAMOND PRODUCT AND APPARATUS FOR CARRYING IT OUT

(71) Applicant: SYNOVA S.A., Duillier (CH)

(72) Inventors: Bernold Richerzhagen, Saint-Sulpice (CH); Jérémie Diboine, Lausanne (CH); Jérôme Genton, Lausanne (CH); Amédée Zryd, Denges (CH)

(73) Assignee: SYNOVA S.A., Duillier (CH)

( * ) Notice: Subject to any disclaimer, the term of this patent is extended or adjusted under 35 U.S.C. 154(b) by 141 days.

(21) Appl. No.: 18/009,838

(22) PCT Filed: Jun. 14, 2021

(86) PCT No.: PCT/EP2021/065948
§ 371 (c)(1),
(2) Date: Dec. 12, 2022

(87) PCT Pub. No.: WO2021/254955
PCT Pub. Date: Dec. 23, 2021

(65) Prior Publication Data
US 2023/0218052 A1   Jul. 13, 2023

(30) Foreign Application Priority Data

Jun. 15, 2020 (EP) .................................... 20179912

(51) Int. Cl.
*A44C 17/00* (2006.01)
*B23K 26/0622* (2014.01)
(Continued)

(52) U.S. Cl.
CPC ........ *A44C 17/001* (2013.01); *B23K 26/0622* (2015.10); *B23K 26/0823* (2013.01);
(Continued)

(58) Field of Classification Search
CPC .................................................. A44C 17/001
See application file for complete search history.

(56) References Cited

U.S. PATENT DOCUMENTS

| 4,981,717 A | * | 1/1991 | Thaler | C23C 16/26 |
| | | | | 423/446 |
| 5,012,067 A | * | 4/1991 | Sato | B28D 1/221 |
| | | | | 219/121.72 |

(Continued)

FOREIGN PATENT DOCUMENTS

| CN | 109590811 A | * | 4/2019 | ............ B23P 25/006 |
| CN | 110919200 A | * | 3/2020 | |

(Continued)

OTHER PUBLICATIONS

Synova, YouTube, Synova LCS 305 with 5 axes—3D laser machining center for the automatic production of diamond tools, https://www.youtube.com/watch?v=EUazNv5LXq8 , Jul. 12, 2018 (Year: 2018).*

(Continued)

*Primary Examiner* — Timothy Kennedy
(74) *Attorney, Agent, or Firm* — The H.T. Than Law Group

(57) ABSTRACT

The present disclosure relates to the field of Chemical Vapor Deposition (CVD) diamonds and their processing after fabrication. In particular, the present disclosures provides a method for coring and slicing a CVD diamond product, wherein the CVD diamond product comprises a CVD diamond and graphitized material covering several side-faces of the diamond. The method is carried out by an apparatus that provides a laser beam coupled into a fluid jet. The method comprises, for the coring, cutting the product with the laser beam to remove the graphitized material from the side-faces of the diamond. Further, the method comprises, (Continued)

for the slicing, cutting off one or more slices from the diamond with the laser beam.

31 Claims, 11 Drawing Sheets

(51) Int. Cl.
*B23K 26/08* (2014.01)
*B23K 26/14* (2014.01)
*B23K 26/38* (2014.01)
*B23K 26/402* (2014.01)
*B28D 5/04* (2006.01)
*B23K 103/00* (2006.01)

(52) U.S. Cl.
CPC .............. *B23K 26/14* (2013.01); *B23K 26/38* (2013.01); *B23K 26/402* (2013.01); *B28D 5/04* (2013.01); *B23K 2103/52* (2018.08)

(56) References Cited

U.S. PATENT DOCUMENTS

| | | | |
|---|---|---|---|
| 5,247,923 A | 9/1993 | Lebourg | |
| 6,405,562 B1 * | 6/2002 | Zimet | A44C 17/001 |
| | | | D11/89 |
| 7,288,738 B2 * | 10/2007 | Patel | B24B 9/16 |
| | | | 219/121.73 |
| 9,221,289 B2 * | 12/2015 | Prest | G02B 1/10 |
| 10,016,845 B2 * | 7/2018 | Richerzhagen | B23K 26/123 |
| 2006/0070982 A1 * | 4/2006 | Patel | B23K 26/042 |
| | | | 219/121.68 |
| 2010/0000507 A1 * | 1/2010 | Linares | A44C 17/001 |
| | | | 63/32 |
| 2010/0101387 A1 * | 4/2010 | Gupta | C30B 11/14 |
| | | | 117/216 |
| 2014/0030443 A1 * | 1/2014 | Prest | B41M 5/24 |
| | | | 427/256 |
| 2015/0121960 A1 * | 5/2015 | Hosseini | A44C 17/00 |
| | | | 65/29.11 |
| 2017/0306524 A1 | 10/2017 | Bennett et al. | |
| 2018/0146751 A1 * | 5/2018 | Vets | A44C 17/001 |
| 2018/0271234 A1 * | 9/2018 | Monachon | B23K 26/38 |
| 2018/0360175 A1 * | 12/2018 | Hosseini | A44C 17/001 |
| 2019/0010605 A1 * | 1/2019 | Iso | H01L 21/02433 |
| 2019/0345632 A1 * | 11/2019 | Tsach | C30B 25/205 |
| 2020/0087782 A1 | 3/2020 | Green et al. | |
| 2020/0094364 A1 * | 3/2020 | Garrn | C23C 16/27 |
| 2021/0170529 A1 * | 6/2021 | Richerzhagen | B23K 26/36 |
| 2022/0305563 A1 * | 9/2022 | Shamoto | B23K 26/361 |

FOREIGN PATENT DOCUMENTS

| | | | | |
|---|---|---|---|---|
| EP | 624423 A2 * | 11/1994 | | B23K 26/40 |
| EP | 3215308 A1 | 9/2017 | | |
| GB | 2532138 A | 5/2016 | | |
| JP | 2005073719 A * | 3/2005 | | |
| NL | 9400164 A * | 9/1995 | | B23K 26/40 |
| WO | WO-2004105999 A1 * | 12/2004 | | B23K 26/02 |

OTHER PUBLICATIONS

Synova, YouTube, The 813-carat Constellation Diamond cut with Synova's DCS 300 Laser Diamond Cutting System, https://www.youtube.com/watch?v=HLX3HINz2-s , May 29, 2018 (Year: 2018).*
Machine translation of NL 9400164, retrieved from USPTO database May 1, 2025 (Year: 2025).*
Machine translation of JP 2005073719, retrieved from USPTO database May 1, 2025 (Year: 2025).*
Machine translation of CN 109590811, retrieved from USPTO database May 1, 20205 (Year: 2025).*
Machine translation of CN 110919200, retrieved from USPTO database May 1, 2025 (Year: 2025).*
International Search Report and Written Opinion issued in connection with the corresponding International Application No. PCT/EP2021/065948 on Aug. 20, 2021.
Indian Examination Report issued in connection with the corresponding Indian Patent Application No. 202247068343 on Jan. 20, 2023.

* cited by examiner

METHOD FOR CORING AND SLICING A CVD DIAMOND PRODUCT AND APPARATUS FOR CARRYING IT OUT

TECHNICAL FIELD

The present disclosure relates to the field of Chemical Vapor Deposition (CVD) diamonds and their processing after fabrication. In particular, the present disclosures provides a method for coring and slicing a CVD diamond product, wherein the CVD diamond product comprises a CVD diamond and graphitized material covering several side-faces of the diamond. The method is carried out by an apparatus that provides a laser beam coupled into a fluid jet.

BACKGROUND

CVD diamonds are lab created synthetic diamonds, and CVD is a process performed in a controlled laboratory and creates the exact physical and chemical properties of a natural diamond. The CVD method includes placing a diamond seed into a vacuum chamber, and filling this chamber with carbon rich gas at a temperature of nearly 815° C. The gas turns into plasma at these high temperatures, thereby causing the release of carbon pieces. These carbon pieces become layered onto the diamond seed in the chamber, which accordingly causes the CVD diamond to grow. The final CVD diamond product comprises the grown CVD diamond and thick graphitized layers or pieces, which typically cover the side-faces of the diamond. CVD diamonds are typically grown from seed diamond plates which become part of the new CVD diamond. The growth is mostly along one direction, but may also be along the other two directions.

To further process the grown CVD diamond (product), the graphitized layer or pieces need to be removed from the diamond, which is referred to as "coring" the CVD diamond. Furthermore, it may be desired to separate the CVD diamond into several smaller pieces, e.g., into thin slices, which is referred to as "slicing" the CVD diamond.

Conventionally, the steps of coring and slicing of the diamond are performed separately, and both have specific disadvantages. For example, the coring of a CVD diamond is typically a quite lengthy and cumbersome process. Furthermore, due to limited coring accuracy, waste of diamond material is often a problem. After the coring, the CVD diamond needs to be manipulated, in order to enable the subsequent slicing, which results in further time loss. Slicing the diamond is moreover difficult, due to the hardness of the diamond and the relatively high thickness. As a consequence, the obtained diamond slices are typically not exactly parallel, and have rather rough cut surfaces. Moreover, micro-cracks often deteriorate the quality of the cut slices. Also, the thinness of the slices has limits, and thus the diamond can conventionally be separated only into a certain maximum number of slices.

Therefore, embodiments of the invention aim at improving the conventional ways of coring and slicing a CVD diamond (product). An objective is in particular to provide a method and apparatus, which are able to core and slice the CVD diamond full-automatically starting from the CVD diamond product, i.e., without any human interaction, and without the need for any intermediate manipulation of the product.

The overall process time for obtaining the diamond slices from the CVD diamond product should be significantly reduced. In addition, the slices should be manufactured with a very high precision, i.e., with an improved surface roughness and more parallel to each other than is conventionally achieved. Also, the slice quality should be improved, in particular, with respect to a reduced occurrence of micro-cracks and surface roughness. Another goal is to increase the number of slices obtainable from a diamond, i.e., to enable the diamond slices to be thinner. Furthermore, the loss of material inside the cut kerf should be reduced, because the cutting kerf width is reduced for larger thickness diamond product.

The above goals should particularly be achievable for all types of CVD diamonds. Notably, for coring and slicing a CVD diamond product, no solution for a full-automatic process exists up to now.

SUMMARY OF THE INVENTION

The objective is achieved by the embodiments presented in the enclosed independent claims. Advantageous implementations of these embodiments are defined in the dependent claims.

In particular, the embodiments of the invention base generally on the use of an apparatus for implementing a method of coring and slicing the CVD diamond product, wherein the apparatus provides a laser beam that is guided in a fluid jet by internal reflection. This fluid-jet guided laser beam can efficiently cut the graphitized material and also the ultra-hard diamond of the product with a very high precision. For instance, the cutting can be carried out with a very narrow and constant kerf and produces a very small taper. This in particular allows slicing of completely parallel slices in the shape of a cuboid plate with right angles.

A first aspect of the present disclosure provides a method for coring and slicing a CVD diamond product, the product comprising a diamond and graphitized material covering several side-faces of the diamond, wherein the method is performed by an apparatus providing a laser beam coupled into a pressurized fluid jet, and wherein the method comprises: for the coring, cutting the product with the laser beam to remove the graphitized material from the side-faces of the diamond; for the slicing, cutting off one or more slices from the diamond with the laser beam.

The method of the first aspect allows coring (removing one or more graphitized pieces or layers from the diamond; notably, "the graphitized material" may comprise a mixture of diamond and graphite in a compound) and slicing the diamond (producing one or more diamond slices) in a fully-automatic manner and with a significantly shorter process time. No human interaction or handling of the diamond is needed, in particular, in between the coring and the slicing steps. Furthermore, very thin slices, exactly parallel slices, slices with a greatly improved (i.e., lower) surface roughness, and slices without micro-cracks can be obtained.

In an implementation form of the method of the first aspect, the product is positioned into a first orientation for the coring, and into a second orientation for the slicing.

In an implementation form of the first aspect, the method further comprises: measuring a surface orientation of a top and/or bottom face of the diamond; and determining the second orientation for the slicing and/or a slicing direction, based on the measured surface orientation.

That is, the top and/or surface of the CVD diamond may first be measured, to then adapt to the measured orientation. The measured surface may correspond to the surface of a seed plate, out of which the CVD diamond was grown. The slicing direction may be adapted to be parallel to the measured surface, or parallel to a crystallographic orientation deduced from this surface. The surface orientation may be measured by a distance sensor (e.g., an optical sensor or touch probe), for instance, with at least three measurement points. The distance sensor may be part of the apparatus.

In an implementation form of the method of the first aspect, the first orientation for the coring is the same as the second orientation for the slicing; or the second orientation for the slicing is tilted by 5-20°, in particular by 10-15°, with respect to the first orientation for the coring; or the second orientation for the slicing is turned by 90° with respect to the first orientation for the coring.

Thereby, a particular fast (shorter process time) and efficient coring and slicing process is achieved. With the tilting of the two orientations, slicing the diamond from both sides is possible.

In an implementation form of the method of the first aspect, the slicing comprises positioning the product into the second orientation for initializing the cut for a set of slices from the diamond, and turning the product by 180° for finishing the cutting off of the set of slices from the diamond.

Thus, the method may comprise cutting twice (from different sides) inside the same kerf. This may allow thicker CVD products and/or diamonds to be cut.

In an implementation form of the method of the first aspect, the method further comprises trimming the CVD diamond product, by cutting the diamond with the laser beam parallel to its top-face and/or its bottom-face; wherein the product is positioned into a third orientation for the trimming.

The trimming step further improves the quality of the slices obtained after slicing. For instance, a graphitized layer on the top-face and/or bottom-face may be removed, and thus does not have to be removed from the slices. No mechanical polishing is needed. Further, dimensions of the slices can be determined by the trimming step.

In an implementation form of the method of the first aspect, the method comprises for the coring: cutting the product with the laser beam along a first side-face of the diamond, to remove a first graphitized piece; and cutting the product with the laser beam along a second side-face of the diamond opposite the first side-face, to remove a second graphitized piece; for the trimming, after the coring: repositioning the product into the third orientation; cutting the diamond with the laser beam parallel to its top-face, and cutting the diamond with the laser beam parallel to its bottom-face; for the slicing, after the trimming: repositioning the product into the second orientation; cutting the product with the laser beam along a third side-face of the diamond perpendicular to the first and second side-face, to remove a third graphitized piece; and cutting off one or more slices from the diamond with the laser beam, wherein each slice is cut off parallel to the cut along the third side-face, and wherein the last slice is cut off along a fourth side-face of the diamond opposite to the third side-face.

This implementation form enables a particular fast and complete coring, trimming, and slicing of the diamond. No human interaction is required, i.e., no intermediate manipulation. Multiple CVD products can be cored, trimmed, and sliced in this manner, efficiently one after the other.

In an example of this implementation form, in which 14 diamond slices of 5×7×0.25 mm each were produced, the cutting time per CVD diamond product was only 35-40 min, for all steps.

In an implementation form of the method of the first aspect, the method comprises rotating the product from the first orientation for the coring by about 90° into the third orientation for the trimming; and rotating the product back from the third orientation for the trimming by the about 90° into the second orientation for the slicing or keeping the same orientation for the slicing.

In an implementation form of the method of the first aspect, trimming the product comprises cutting the top-face and the bottom-face of the diamond such that all faces of the diamond have a determined dimension and orientation.

In an implementation form of the method of the first aspect, the slicing comprises cutting off the one or more slices from the diamond parallel to its top face and/or its bottom face.

In an implementation form of the method of the first aspect, the method further comprises coring and slicing, one after the other, each of one or more further products in the same manner as the product.

This batch processing further reduces the process time per product.

In an implementation form of the method of the first aspect, the method is performed automatically and/or seamlessly by the apparatus; and/or the method is performed by the apparatus in a single process.

In an implementation form of the method of the first aspect, between 5 and 20 slices, in particular between 10 and 15 slices, are cut off from the diamond.

Thus, about 50% more slices can be obtained than with conventional coring and slicing approaches.

In an implementation form of the method of the first aspect, each slice has a thickness in a range of 0.1-0.4 mm, in particular in a range of 0.2-0.3 mm.

Thus, the obtained diamond slices are thinner than slices obtained with conventional coring and slicing approaches.

In an implementation form of the method of the first aspect, an average surface roughness of a cut surface of a slice is in a range of 200-600 nm, in particular in a range of 300-500 nm.

Thus, an improved surface roughness compared to conventional coring and slicing approaches is achieved. Very smooth slices are obtained. For instance, an average surface roughness of 367 nm was measured in one example, in which 14 slices (each of 5×7×0.25 mm) were produced. No further mechanical polishing is needed. The method is especially advantageous for large slice sizes of e.g. 10×10 mm or up to 20×20 mm.

In an implementation form of the method of the first aspect, a kerf produced by cutting with the laser beam is in a range of 25-100 μm, in particular in a range of 40-60 μm; and/or a taper produced by cutting with the laser beam is in a range of 1-2°, in particular less than 1°.

Thus, a particular accurate cutting, and particularly slicing, of the diamond is possible. Additionally, the narrow kerf reduces the lost diamond material inside the kerf.

In an implementation form of the method of the first aspect, cutting with the laser beam comprises multi-pass cutting with a displacement speed of the laser beam relative to the product being in a range of 3-20 mm/s.

This allows to core and slice the product with very high speed, leading to a significantly reduced process time.

In an implementation form of the method of the first aspect, cutting the diamond comprises cutting along a determined crystallographic orientation of the diamond.

Consequently, the diamond slices can become perfectly parallel and may very low surface roughness. Also, microcracks can be effectively avoided. Further, this also is advantageous in case the slices will be re-used as seeds for new CVD diamond growth.

In an implementation form of the method of the first aspect, the laser beam is pulsed, and a pulse intensity of the laser beam in the fluid jet is in a range of 0.8-2 $GW/cm^2$, and/or an average power of the laser beam is in a range of 20-300W, and a pulse length of the laser beam is in a range of 150-400 ns.

In this way, the diamond can be cut very fast and with high precision.

In an implementation form of the method of the first aspect, the method further comprises receiving, by the apparatus during the cutting of the product, a laser-induced electromagnetic radiation, propagating away from the product, in particular radiation from a plasma formed at the surface of the product by cutting it with the laser beam; converting the received radiation into a signal; and determining whether the laser beam has broken through the product based on the signal.

By determining when the laser beam breaks through the product, e.g. through the graphitized material or diamond (depending on which is cut), the process time can again be reduced.

In an implementation form of the method of the first aspect, the laser-induced electromagnetic radiation is received by the apparatus through the fluid jet.

This enables a very compact apparatus. Furthermore, the sensitivity of measuring the produced radiation is high, thus enabling a precise control of the cutting.

A second aspect of the present disclosure provides an apparatus for coring and slicing a CVD diamond product comprising a diamond and graphitized material covering several side-faces of the diamond: a machining unit configured to provide a laser beam coupled into a pressurized fluid jet; and a control unit configured to control the machining unit to: for the coring, cut the product with the laser beam to remove the graphitized material from the side-faces of the diamond; for the slicing, cut off one or more slices from the diamond with the laser beam.

In an implementation form of the apparatus of the second aspect, the control unit is further configured to position the product into a first orientation for the coring, and into at least a second orientation for the slicing.

In an implementation form of the apparatus of the second aspect, the control unit is further configured to control the machining unit to: trim the CVD diamond product, by cutting the diamond with the laser beam parallel to its top-face and/or its bottom-face; wherein the product is positioned into a third orientation for the trimming.

In an implementation form of the apparatus of the second aspect, the control unit is configured to: for the coring: cut the product with the laser beam along a first side-face of the diamond, to remove a first graphitized piece; cut the product with the laser beam along a second side-face of the diamond opposite the first side-face, to remove a second graphitized piece; for the trimming, after the coring: reposition the product into the third orientation; cut the diamond with the laser beam parallel to its top face, and cut the diamond with the laser beam parallel to its bottom face; for the slicing, after the trimming: reposition the product into the second orientation; cut the product with the laser beam along a third side-face of the diamond perpendicular to the first and second side-face, to remove a third graphitized piece; and cut off one or more slices from the diamond with the laser beam, wherein each slice is cut off parallel to the cut along the third side-face, and wherein the last slice is cut off along a fourth side-face of the diamond opposite to the third side-face.

In an implementation form of the apparatus of the second aspect, the apparatus further comprises: a holder configured to hold multiple CVD diamond products arranged one after the other in a determined direction.

The holder enables the coring, (optionally trimming), and slicing of the multiple CVD diamond products, one after the other, and thus leads to a highly efficient process. For instance, the holder may hold between 5-15, particularly 8-10 CVD diamond products.

In an implementation form of the apparatus of the second aspect, the holder comprises an elongated metal piece and a plurality of holding sections arranged along the holder in the determined direction, wherein each holding section comprises a cutout of the metal piece and one or more attachment pieces for attaching, in particular gluing, a product such that the product is positioned within the cutout with a determined orientation.

In an implementation form of the apparatus of the second aspect, the holder is only attached to (e.g., glued to) graphitized material during the entire coring and slicing of the product. Thus, no e.g. glue remains on the slices after they are produced.

In an implementation form of the apparatus of the second aspect, the machining unit comprises a rotatable element, and the holder is easily attachable to and detachable from the rotatable element.

In an implementation form of the apparatus of the second aspect, the apparatus further comprises an optical sensor configured to determine, during the cutting of the product, whether the laser beam has broken through the product.

In an implementation form of the apparatus of the second aspect, the optical sensor is configured to receive a laser-induced electromagnetic radiation propagating away from the product, in particular radiation from a plasma formed at the surface of the product by cutting it with the laser beam; to convert the received radiation into a signal; and to determine whether the laser beam has broken through the product based on the signal; wherein the optical sensor is, in particular, arranged to receive the radiation through the fluid jet.

In an implementation form of the second aspect, the apparatus further comprises a distance sensor configured to measure a surface orientation of a top and/or bottom face of the diamond; and the control unit is configured to determine the second orientation for the slicing and/or a slicing direction, based on the measured surface orientation.

The apparatus enables implementing the method of the first aspect, and therefore achieves all the advantages described above.

A third aspect of the present disclosure provides a computer program (or a computer program product) comprising a program code either for controlling the apparatus according to the second aspect and any of its implementation forms, when being performed by a processor, in particular of the control unit; or for performing the method according to the first aspect or any of its implementation forms.

A fourth aspect of the present disclosure provides a non-transitory storage medium storing executable program code which, when executed by a processor, causes the method according to the first aspect or any implementation thereof to be performed.

BRIEF DESCRIPTION OF DRAWINGS

The above-described aspects and implementation forms defining general embodiments according to the invention are explained in the following description of specific embodiments in relation to the enclosed drawings, in which.

DETAILED DESCRIPTION OF EMBODIMENTS

Figure 1:
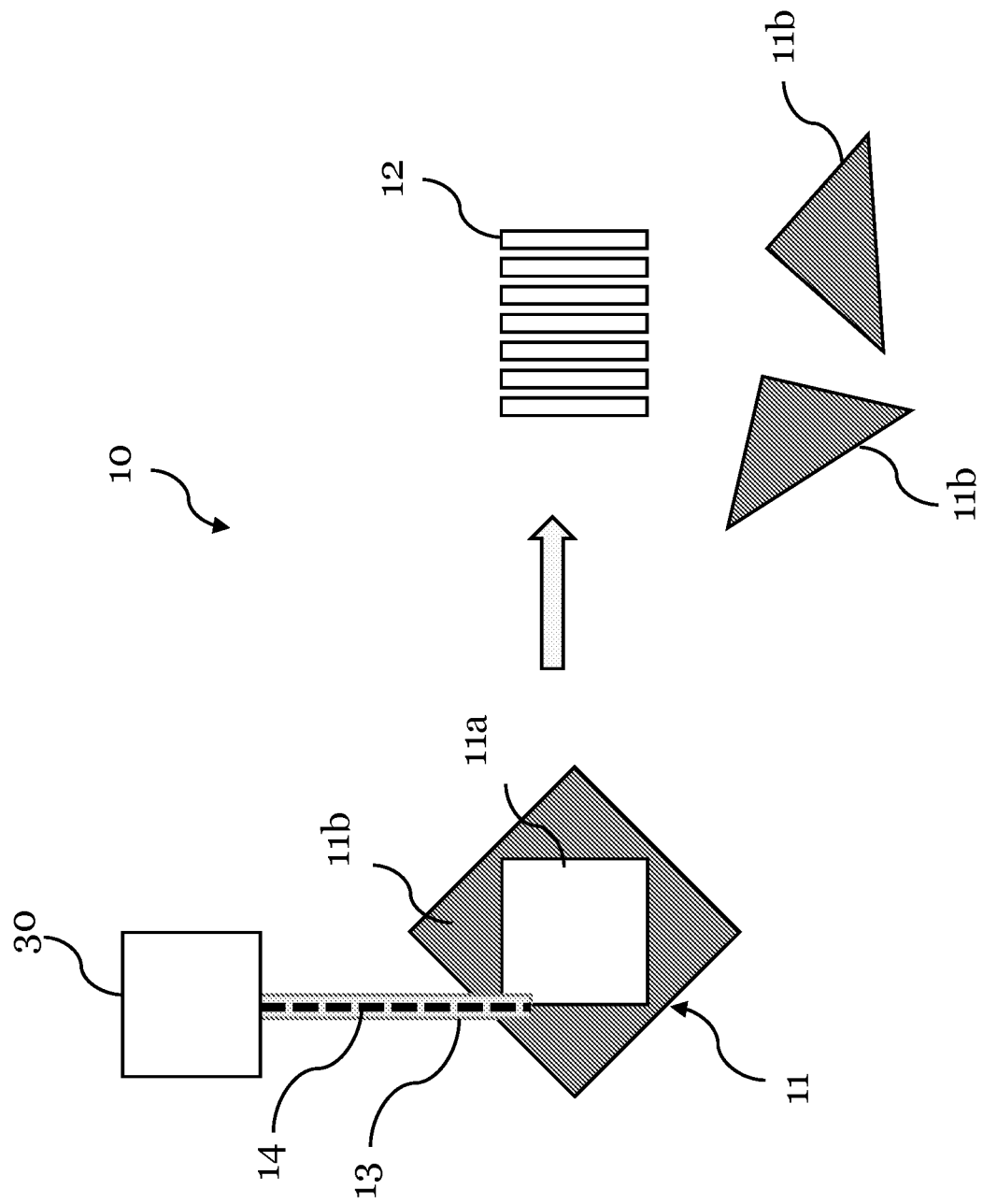
FIG. 1 illustrates a method according to an embodiment of the invention, and schematically an apparatus according to an embodiment of the invention that performs the method.

FIG. 1 shows schematically a method 10 according to an embodiment of the invention. Steps of the method 10 are shown in a flow-diagram in FIG. 2. The method 10 is suitable for coring 21 and slicing 22 a CVD diamond product 11. Such a CVD diamond product comprises a diamond 11a and graphitized material 11b covering several side-faces of the diamond 11a. For example, the crystalline diamond 11a may be a rectangular diamond, or cubic diamond (e.g., between 5×5×5 mm to 20×20×20 mm), and the graphitized material 11b may cover four side-faces of the diamond 11a. Each side-face of the diamond 11a may be covered by a thick piece of unwanted graphitized material, which generally consists in a compound of diamond microcrystals and graphite. The top-face and the bottom-face of such a rectangular or cubic diamond 11a may not be covered by graphite material 11b, or may not be covered by thick graphite pieces but only by a small layer of graphite material 11b.

Figure 3:
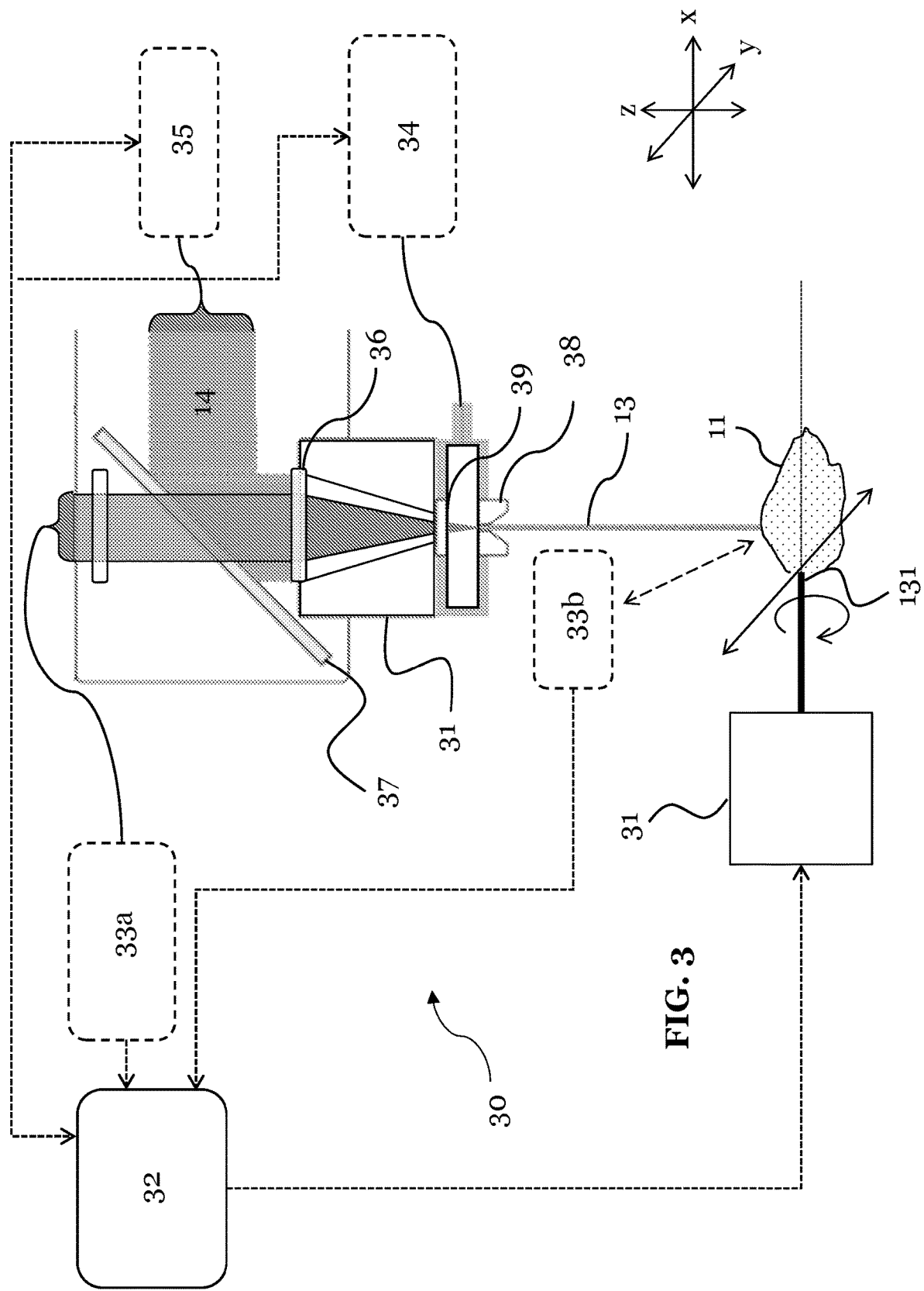
FIG. 3 shows details of an apparatus according to an embodiment of the invention.

The method may be carried out by an apparatus 30 according to an embodiment of the invention, as illustrated schematically in FIG. 1 or as shown with more, optional details in FIG. 3. The apparatus 30 is configured to provide a laser beam 14 coupled into a pressurized fluid jet 13, i.e., provides a fluid-jet-guided laser beam. The fluid jet 13 may comprise a liquid jet, particularly a water jet.

The method 10 comprises a step 21 of coring the CVD diamond product 11, wherein the product 11 is cut by the laser beam 14 of the apparatus 30 to remove the graphite material 11b from the side-faces of the diamond 11a. Further, the method 10 comprises a step 22 of slicing the CVD diamond product 11, wherein one or more slices 12 are cut off from the diamond 11 a with the laser beam 14 of the apparatus. The step of slicing 22 can, but does not necessarily have to, be performed after the step of coring 21. For instance, the two steps of coring 21 and slicing 22 can be performed in an interleaved manner, e.g., at first graphite material 11b can be removed from one or more side-faces of the diamond 11a, then the diamond 11a may be sliced, and then further graphite material can be removed from the remaining side-faces 11b of the diamond 11a.

For instance, between 5 and 20 slices 12, in particular between 10 and 15 slices 12, may be cut off from the diamond 11a. Thereby, each slice may have a thickness in a range of only 0.1-0.4 mm, in particular in a range of 0.2-0.3 mm. In addition, an average surface roughness of a slice surface 12 (cut surface of the slice 12) may be in a range of only 200-600 nm, in particular in a range of 300-500 nm. The cutting of the diamond 11 may be performed along one or more determined crystallographic diamond orientations, in order to obtain the slices 12. The slices 12 may become perfectly parallel to each other. Overall, the quality of the diamond slices is thus very high.

The cutting of the graphitized material 11b or diamond 11a can be performed by multi-pass cutting. That is, for each cut performed along a cutting path (e.g., straight and/or along a determined crystallographic diamond orientation), can be performed by moving the laser beam 14 quickly back and forth along that path. High displacement speeds of the laser beam 14 relative of the product 11 are thereby possible. Overall, the coring 21 and slicing 22 can thus be carried out fast.

Notably, the method 10 is, in particular, performed automatically and/or seamlessly by the apparatus 30. Further, the method 10, in particular, is performed by the apparatus 30 in a single process. Therefore, the method 10 can be carried out efficiently and fast.

Further, the product 11 may be positioned into particular orientations, e.g. different orientations, for the particular steps of the method 10. For instance, the product 11 may be positioned into a first orientation for the coring 21, and into a second orientation for the slicing 22. Thereby, the second orientation for the slicing 22 may tilted with respect to the first orientation for the coring 21. For example, the second orientation for the slicing 22 may be tilted by 5-20°, in particular by 10-15°, with respect to the first orientation for the coring 21.

Figure 2:
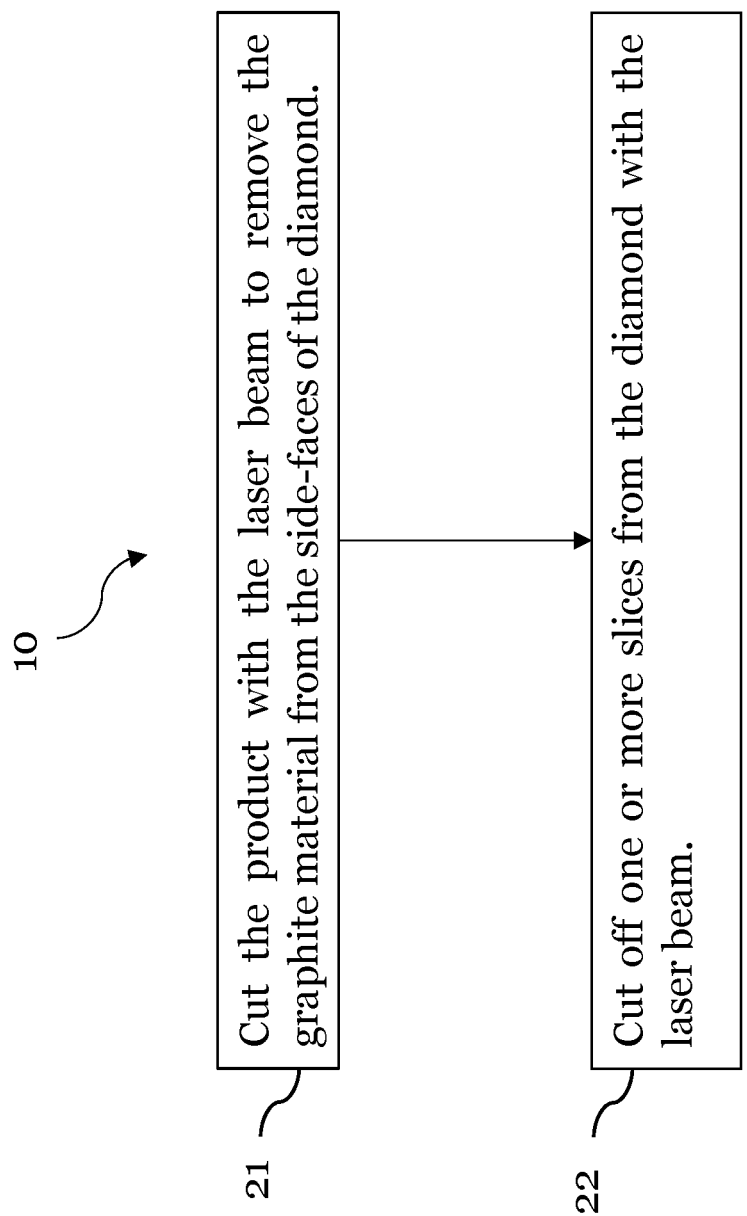
FIG. 2 shows a schematic flow diagram of a method according to an embodiment of the invention.

FIG. 3 shows an apparatus 30 according to an embodiment of the invention. The apparatus 30 is configured to core and slice the CVD diamond product 11, as shown in FIG. 1 or FIG. 2, i.e., may be the apparatus 30 used in the method 10. The apparatus 30 comprises at least a machining unit 31, a control unit 32. The apparatus 30 may further comprise an optical sensor 33a, a distance sensor 33b, and further optionally other elements and units described below.

The machining unit 31 is configured to provide a laser beam 14 coupled into a pressurized fluid jet 13. The control unit 32 is configured to control the machining unit 31. In particular, it may control the machining unit 31 to: for the coring 21, cut the product 11 with the laser beam 14 to remove the graphitized material 11b from the side-faces of the diamond 11a; and for the slicing 22, cut off one or more slices 12 from the diamond 11a with the laser beam 14. These actions may implement the method 10 shown in FIG. 1 and FIG. 2. The optional optical sensor 33a may be configured to determine, during the coring 21 and slicing 22 of the product 11, whether the laser beam 14 has broken through the product 11, for one or more cuts or for each cut. Thus, the overall processing speed can be significantly improved. The distance sensor 33b may be configured to measure a surface orientation of a top and/or bottom face of the diamond. The control unit 32 may then determine the (best) second orientation for the slicing and/or may determine the (best) slicing direction, based on the measured surface orientation, to enable the most efficient slicing.

The machining unit 31 may couple the laser beam 14—e.g., as received from a laser source 35, which may optionally be a part of the apparatus 30, or e.g. from multiple laser sources 35—into the fluid jet 13. This coupling may be done in the machining unit 31. The machining unit 31 may particularly include an optical element, like at least one lens 36, for coupling the laser beam 14 into the fluid jet 13. The laser beam 14 may be produced outside of the machining unit 31, and may be injected into the machining unit 31. In the machining unit 31, a mirror, and/or a beam splitter 37, and/or another optical element, may guide the laser beam 14 towards e.g. the at least one lens 36. The beam splitter 37 may also be used to couple part of the laser light, or electromagnetic radiation coming from the product 11, to the optical sensor 33a. The machining unit 31 may also include an optically transparent protection window 39, in order to separate the optical arrangement, here exemplarily the optical element 36, from the fluid circuitry (e.g., water circuitry), and from the region of the machining unit 31 where the fluid jet 13 is produced.

For producing the fluid jet 13, the machining unit 31 may include a fluid jet generation nozzle 38 having an aperture of a certain size. The fluid jet generation nozzle 38 may be disposed within the machining unit 31 to produce the fluid jet 13 in a protected environment. The aperture may define the width of the fluid jet 13. The aperture may have, for example, a diameter of 10-200 μm, and the fluid jet 13 may have, for example, a diameter of about 0.6-1 times the aperture diameter. The pressure for the pressurized fluid jet 13 may be provided via an external fluid supply 34, which is typically not part of the apparatus 30 (but can be). For instance, the pressure is between 50-800 bar. For outputting the fluid jet 13 from the apparatus 30, the machining unit 31 may include an exit nozzle with an exit aperture. The exit aperture is particularly wider than the fluid nozzle aperture.

The control unit 32 may further control the at least one laser source 35 (e.g., it may command a laser controller of the laser source 35). That is, the control unit 32 may instruct a laser controller of the laser source 35 to output an according laser emission. The laser controller of the laser source 35 may thereby be able set a constant or pulsed laser beam, for the latter particularly to set a pulse power, pulse width, pulse repletion rate, pulse burs rate, or a pause between pulses according to the instructions of the control unit. For instance, for the coring 21 and slicing 22, a pulse intensity of the laser beam 14 may in a range of 0.8-2GW/cm^2, and/or a pulse power of the laser beam 14 may be in a range of 20-300W, and a pulse length of the laser beam 14 may be in a range of 150-400 ns. The control unit 32 may also control the fluid supply 34.

During the coring 21 and slicing 22, the CVD diamond product 11 may be held by a special holder 100 (described in more detail in FIG. 10), which may or may not be part of the apparatus 30. In either case, the apparatus 30 can be arranged such that it is able to machine the CVD diamond product 11 held by the holder 100. The holder 100 may be attached to a rotatable element 131 of the apparatus 30. The apparatus 30, in particular the control unit 31, may thereby control movements of the holder 100 (particularly the rotatable element 131) in up to three dimensions (e.g. in x-y-z as indicated in FIG. 3, wherein the z-direction is parallel to the fluid jet 13, and the x- and y-directions are perpendicular to the z-direction and to each other). The holder 100 may also be rotated, by means of the apparatus 30 rotating the rotatable element 131. The apparatus 30 is then, in particular, able to cut the CVD diamond product 11 by moving the fluid jet guided laser beam 14 along a cutting path, in particular a two-dimensional path, like a straight and/or arc, over the product 11. Thereby, multi-pass cutting may be performed as described above. Further, the movement may thereby be continuous or stepwise, and a speed of the movement may be selected/changed.

The rotatable element 131 may be driven by a motor or CNC. For instance, the rotatable element 131 of the apparatus 30 may be a rod or a so-called "Dop". By means of the rotatable element 131, the product 11 can be repositioned, i.e., an orientation of the product 11 can be changed, e.g., with respect to the laser beam 14. In particular, the above-mentioned first and second orientation may be set. The rotatable element 131 may be at least 10% smaller, particularly at least 20% smaller (in diameter/width), than the product 11 diameter. The rotatable element 131 may rotate around an axis of revolution (indicated in FIG. 3). The rotation of the rotatable element 131 may be controlled by the control unit 32, particularly based on an input from the optical sensor 33a.

The optical sensor 33a may be arranged to receive a laser-induced electromagnetic radiation that propagates away from the product 11 (e.g., while cutting the product 11 with the laser beam 14), e.g., through the fluid jet 13 and further through at least one optical element 36, 37 towards the optical sensor 33a. The optical sensor 33a may in particular be arranged to receive the laser-induced electromagnetic radiation through the fluid jet 13 and through the at least one optical element 36, which is configured to couple the laser beam 14 into the fluid jet 13. The laser-induced electromagnetic radiation may include secondary radiation emitted from a portion of the product 11 that is cut with the laser beam 14. For instance, the laser-induced electromagnetic radiation may be induced because the cut surface region of the workpiece is transformed into a plasma. This plasma may emit a characteristic radiation, which can be easily isolated on or by the optical sensor 33a. The laser-induced electromagnetic radiation may also include primary laser radiation that is reflected from the product 11. The laser-induced electromagnetic radiation may also include secondary radiation generated by scattering, preferably Raman scattering, of the laser beam 14 in the fluid jet 13.

The distance sensor 33b may be a second optical sensor (i.e., in addition to the optical sensor 33a). In this case, the distance sensor 33b may be arranged to measure optically the surface orientation of the product 11, e.g., by measuring light reflected from the product 11. To this end, the distance sensor 33b may also be configured to send light onto the product 11. The distance sensor 33b may also be a touch probe. In this case, it may be arranged such that it can touch the product 11 for performing the surface orientation measurement, or may be configured such that it can move or be moved towards the product 11 to perform the measurement.

The optical sensor 33a and/or the distance sensor 33b may be arranged in the machining unit 31. However, the optical sensor 33a may also be arranged in the laser source 35. In this case, laser-induced radiation may back-propagate from the product 11, and may be guided through the machining unit 31 to the laser source 35, where it is received by the optical sensor 33a. The machining unit 31 can be optically connected to the laser source 35, for instance, by an optical fiber.

Further, the optical sensor 33a may be configured to convert the received radiation into a signal. The control unit 32 may include processing circuitry, which is configured to determine a state of machining/cutting the product 11 based on the signal. The state of machining the product 11 may be, whether the laser beam 14 has broken through the product 11, i.e., through graphitized material 11b and or diamond 11a. The control unit 32 may in particular be configured to determine whether an executed cut of the graphitized material 11b or of the diamond 11a was completed, or whether such an executed cut was not completed, and/or whether no graphitized material 11b or diamond 11a was removed at all by executing a cut.

The apparatus 30, in particular the control unit 32, may comprise a processor or processing circuitry (not shown) configured to perform, conduct or initiate the various operations of the apparatus 30 described in this disclosure, in particular to perform the method 10. The processing circuitry may comprise hardware and/or the processing circuitry may be controlled by software.

The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The apparatus 30 may further comprise memory circuitry, which stores one or more instruction(s) that can be executed by the processor or by the processing circuitry, in particular under control of the software. For instance, the memory circuitry may comprise a non-transitory storage medium storing executable software code or program code, which, when executed by the processor or the processing circuitry, causes the various operations of the apparatus described in this disclosure, in particular causes the method 100 to be performed.

FIGS. 4-9 illustrate an exemplary method 10 according to an embodiment of the invention, which can be carried out with the apparatus 30 shown in FIG. 3.

Figure 4:
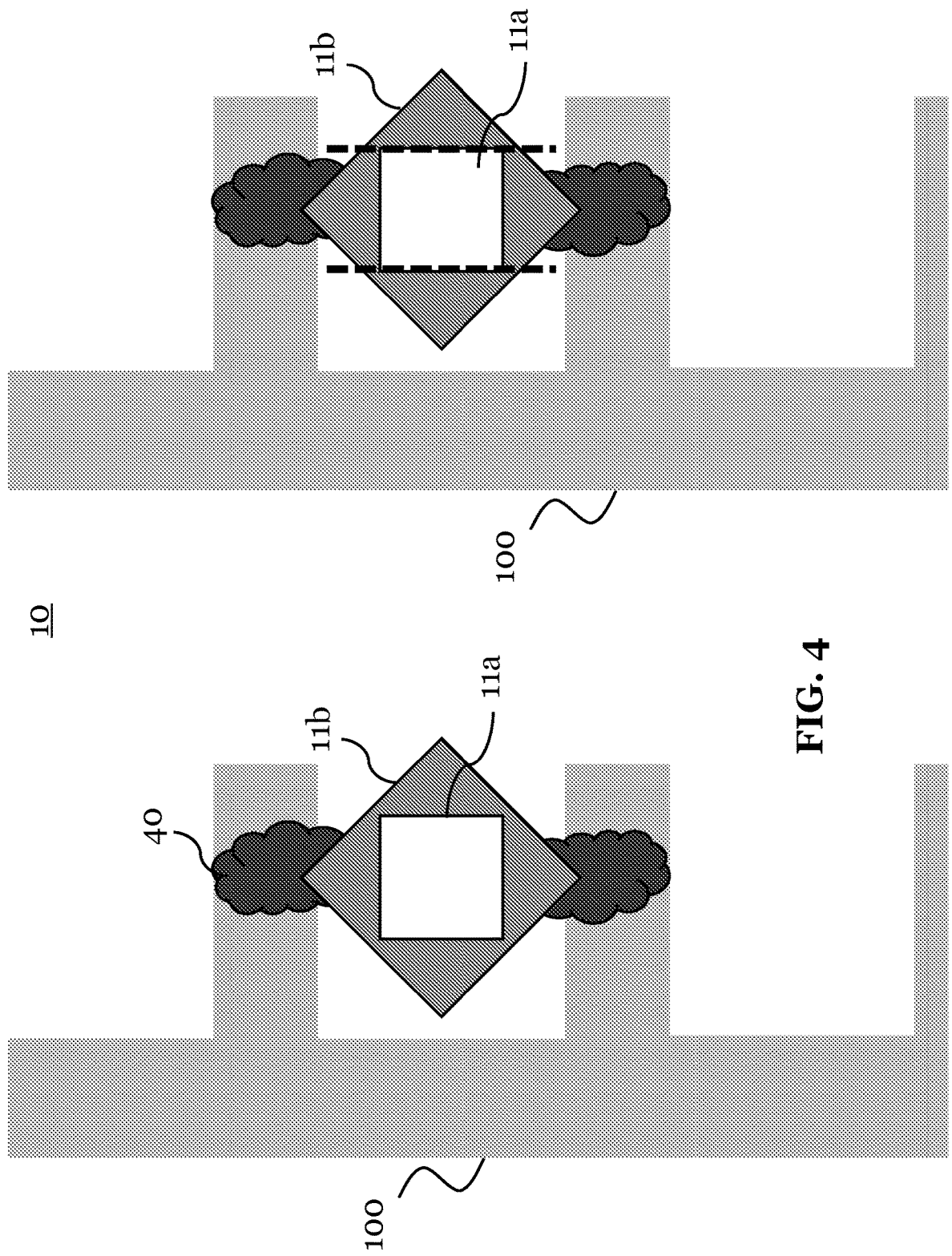
FIG. 4 shows steps of an exemplary method according to an embodiment of the invention.

FIG. 4(*a*) shows that, initially, the CVD diamond product 11 may be attached to a holder 100 (described in more detail with respect to FIG. 10), which may be part of the apparatus 30, or which may be attached to the apparatus 30, e.g., may be attached to the rotatable element 131. The product 11 may be attached to the holder 100 only by the graphitized material 11*b*. In particular, the holder 100 may be only attached to the graphitized material 11*b*, during the entire coring 21 and slicing 22 of the product 11. The product 11, in particular the graphitized material 11*b*, may be glued to the holder 100, for instance, to a holding section of the holder 100.

FIG. 4(*b*) shows first cutting steps for implementing the coring 21. In particular, the product 11 may be cut with the laser beam 14 along a first side-face of the diamond 11*a*, to remove a first graphitized piece, and may be cut along a second side-face of the diamond 11*a* opposite the first side-face, to remove a second graphitized piece. The dashed line in FIG. 4(*b*) indicates the path of the laser beam 14. In FIG. 4, the laser beam 14 exemplarily extends into the figure plane, i.e., parallel to the first and second side-face. Notably, the cutting shown in FIG. 4(*b*) may be carried out in a first orientation of the product 11, i.e., the product 11 may be positioned into the first orientation, wherein orientation is relative to the laser beam 14.

Figure 5:
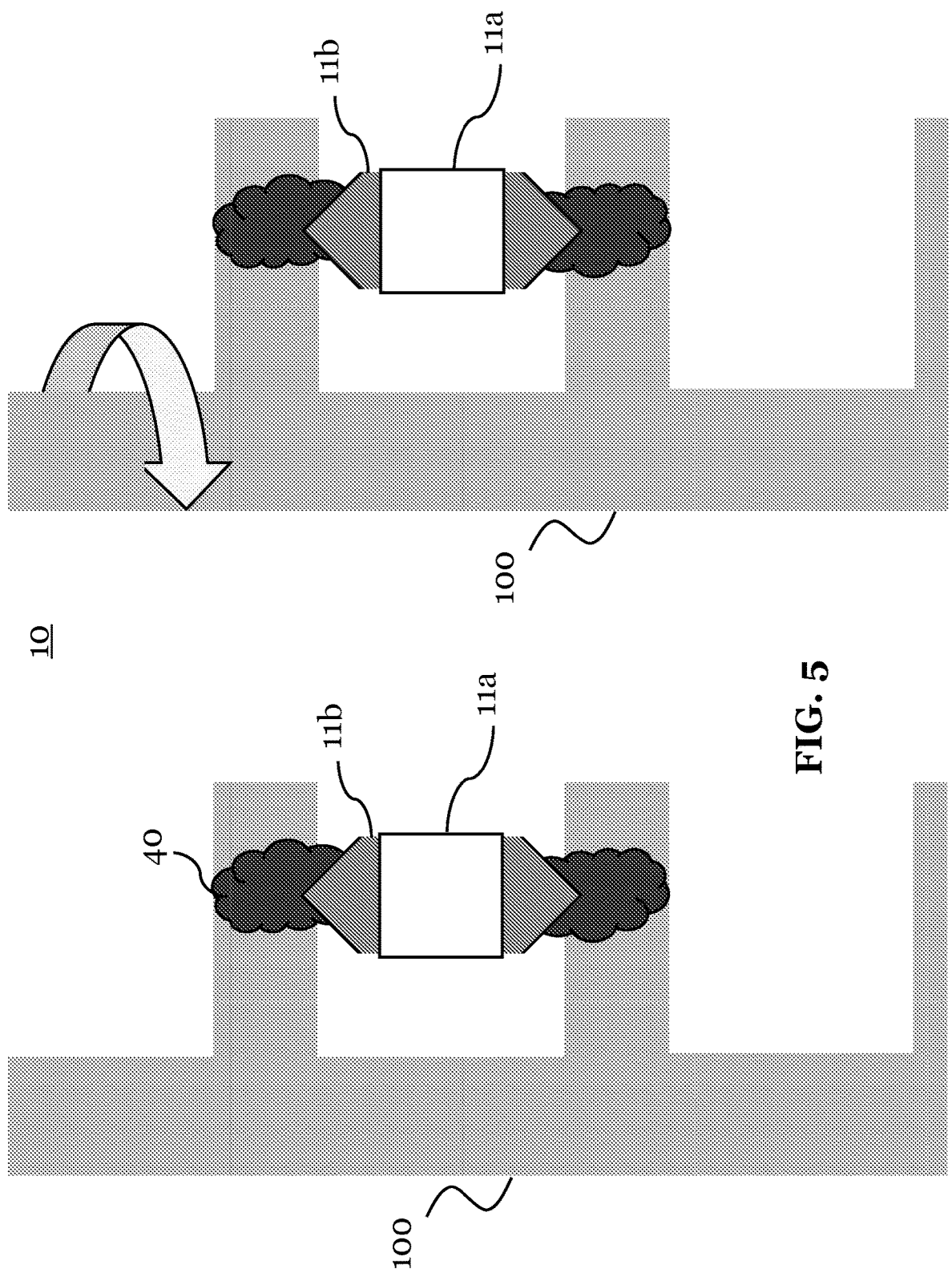
FIG. 5 shows further steps of the exemplary method.

FIG. 5(*a*) shows the product 11 after the cutting steps of FIG. 4(*b*). It can be seen, that the graphitized material 11*b* has been removed from the two opposite side-faces of the diamond 11*a*. FIG. 5(*a*) shows that then the product 11 may be repositioned. In particular, it may in this example be repositioned to a third orientation.

Figure 6:
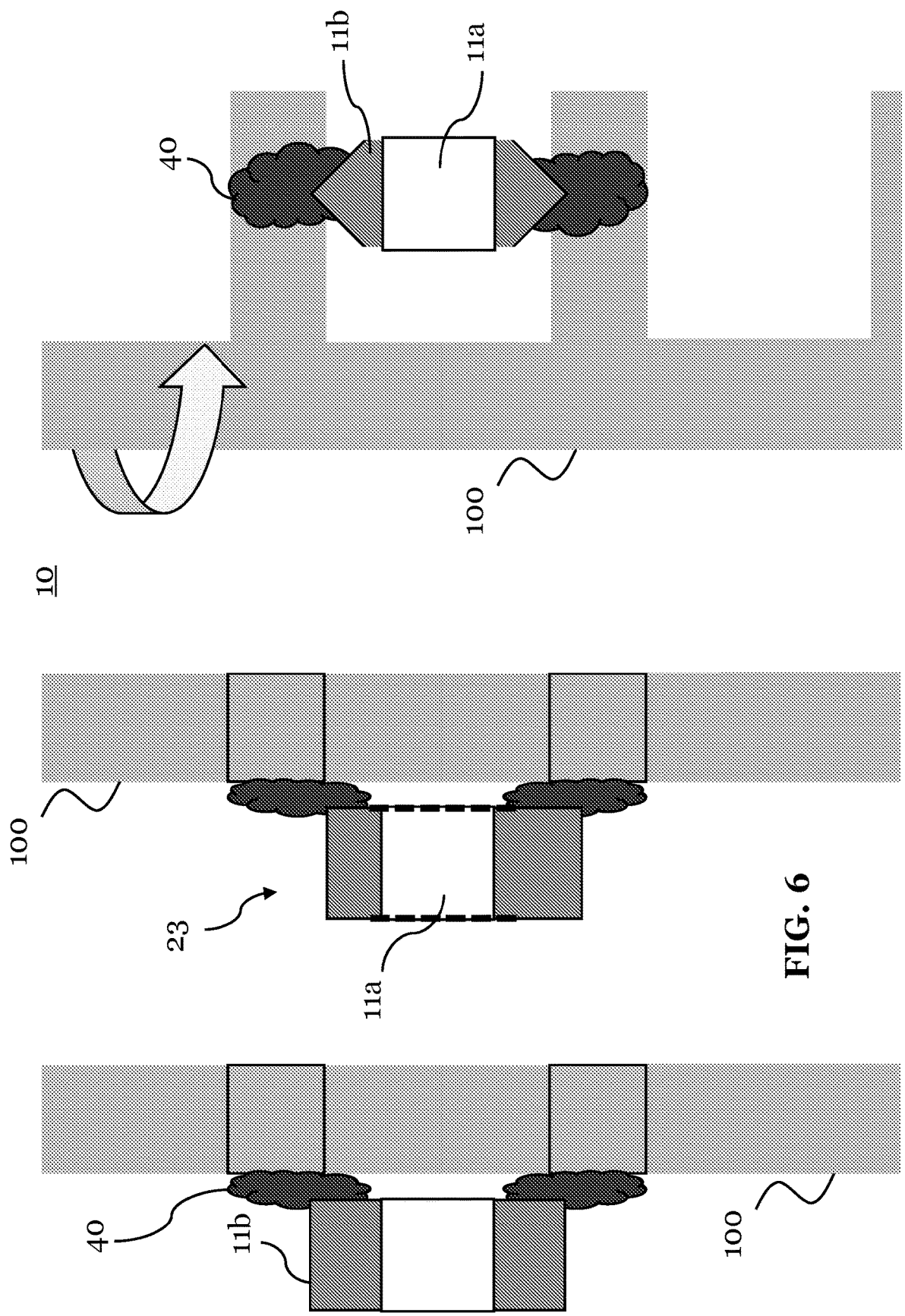
FIG. 6 shows further steps of the exemplary method.

In this example, the product 11 is rotated from the first orientation for the coring 21 by about 90° into the third orientation. FIG. 6(*a*) shows the product 11 in the third orientation after the rotation.

FIG. 6(*b*) shows that in the third orientation a step of trimming 23 the CVD diamond product 11 can be carried out. The trimming 23 of the product 11 is an optional step of the method 10. The trimming 23 of the product 11 may comprises cutting the diamond 11*a* with the laser beam 14 parallel to its top-face, and cutting the diamond 11*a* with the laser beam 14 parallel to its bottom-face, as illustrated by the dashed lines indicating the cutting path of the laser beam 14. The trimming 23 may remove a graphitized layer that was present on the top-face and/or bottom-face. The trimming 23 may comprise cutting the top-face and/or the bottom-face of the diamond 11*a* such that all faces of the diamond 11*a*, i.e. the side-faces and the top-face and bottom face, have a determined dimension. All faces may, in particular, have the same 2D dimensions.

FIG. 6(*c*) shows that then the product 11 may be repositioned. In particular, it may in this example be repositioned to a second orientation for the slicing 22. In particular, in this example the product 11 may be rotated back from the third orientation for the trimming 23 by the about 90°, by which it was rotated from the first orientation for the coring 21, into the second orientation for the slicing 22.

Figure 7:
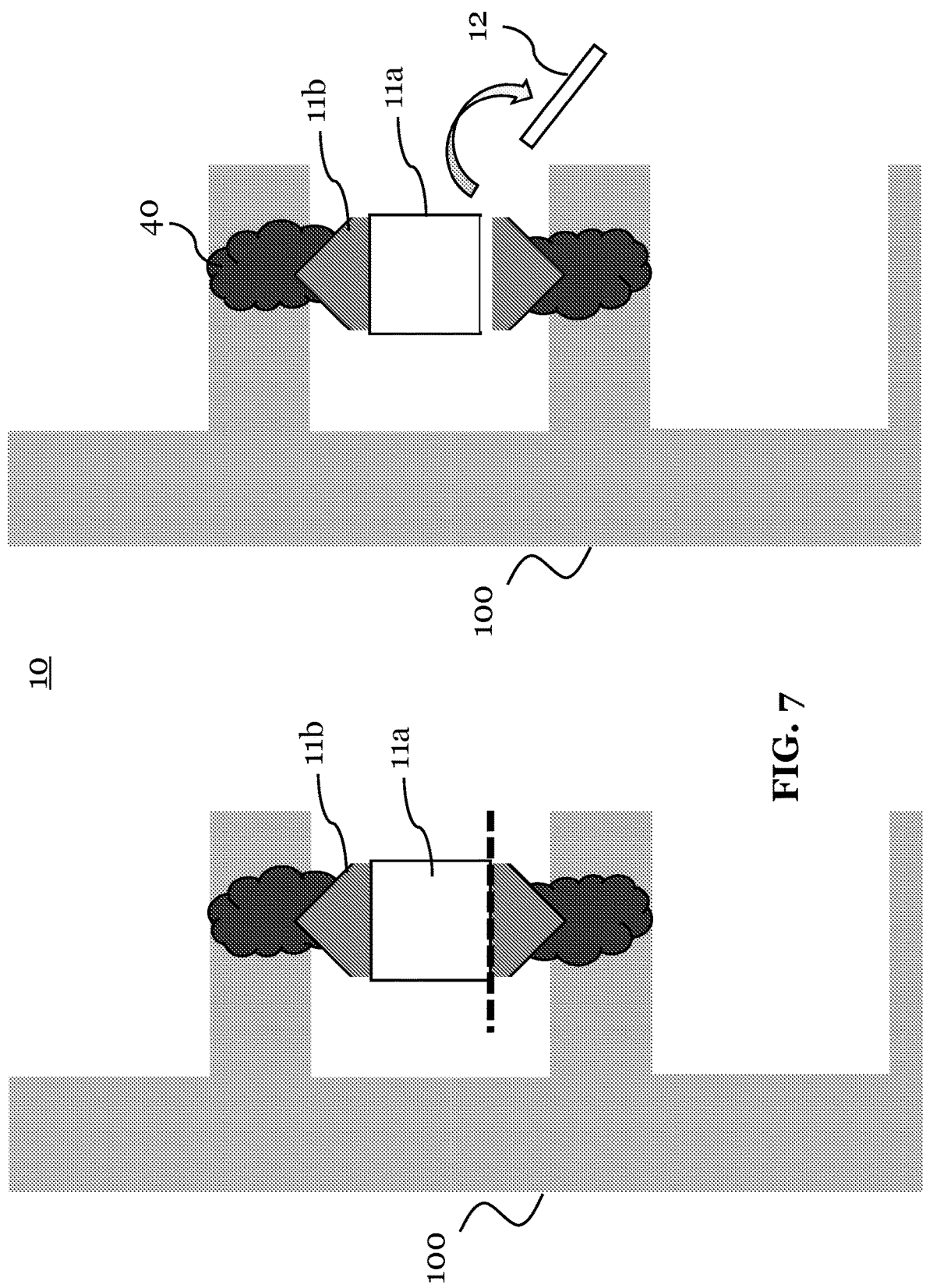
FIG. 7 shows further steps of the exemplary method.
Figure 8:
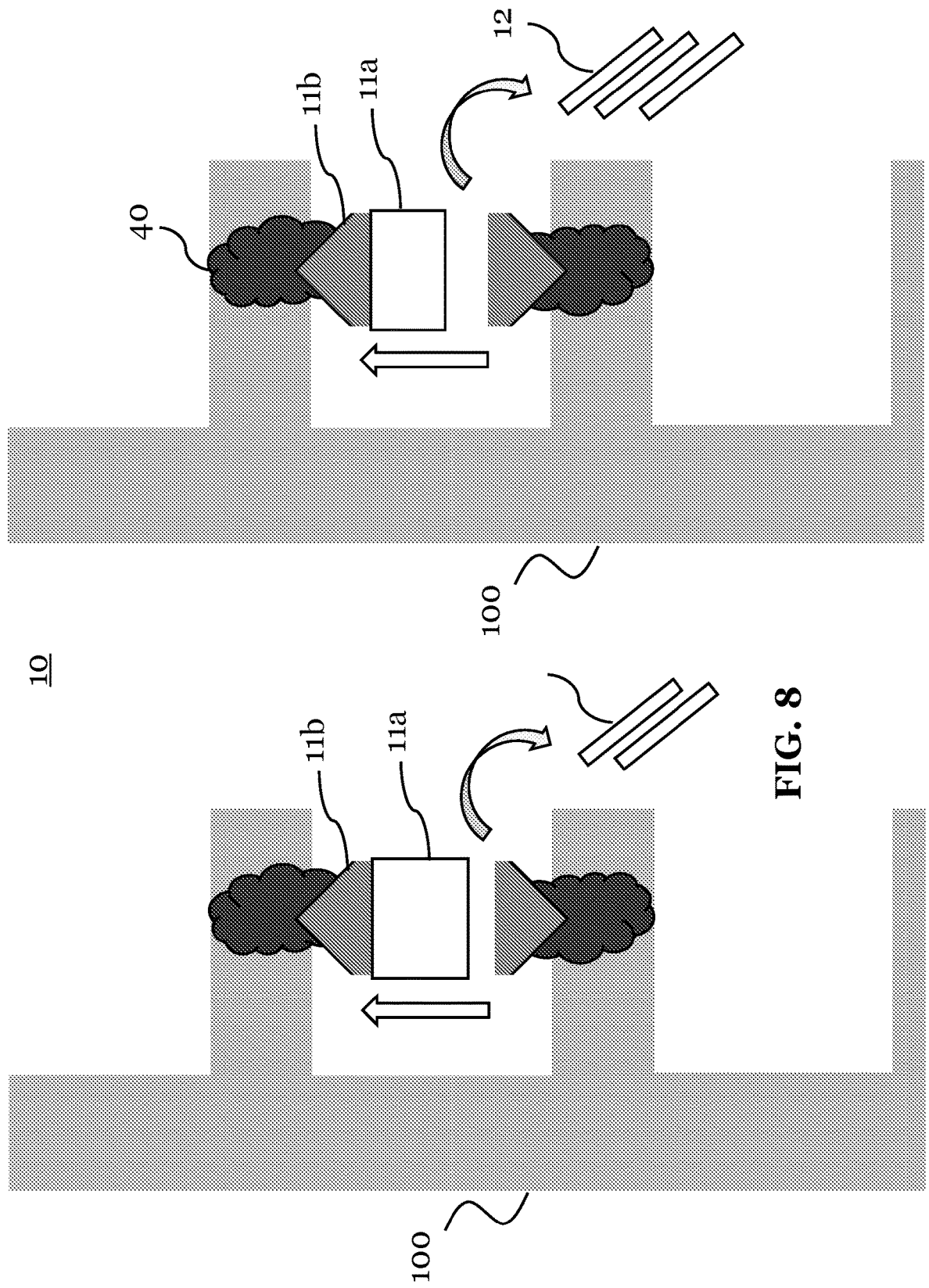
FIG. 8 shows further steps of the exemplary method.
Figure 9:
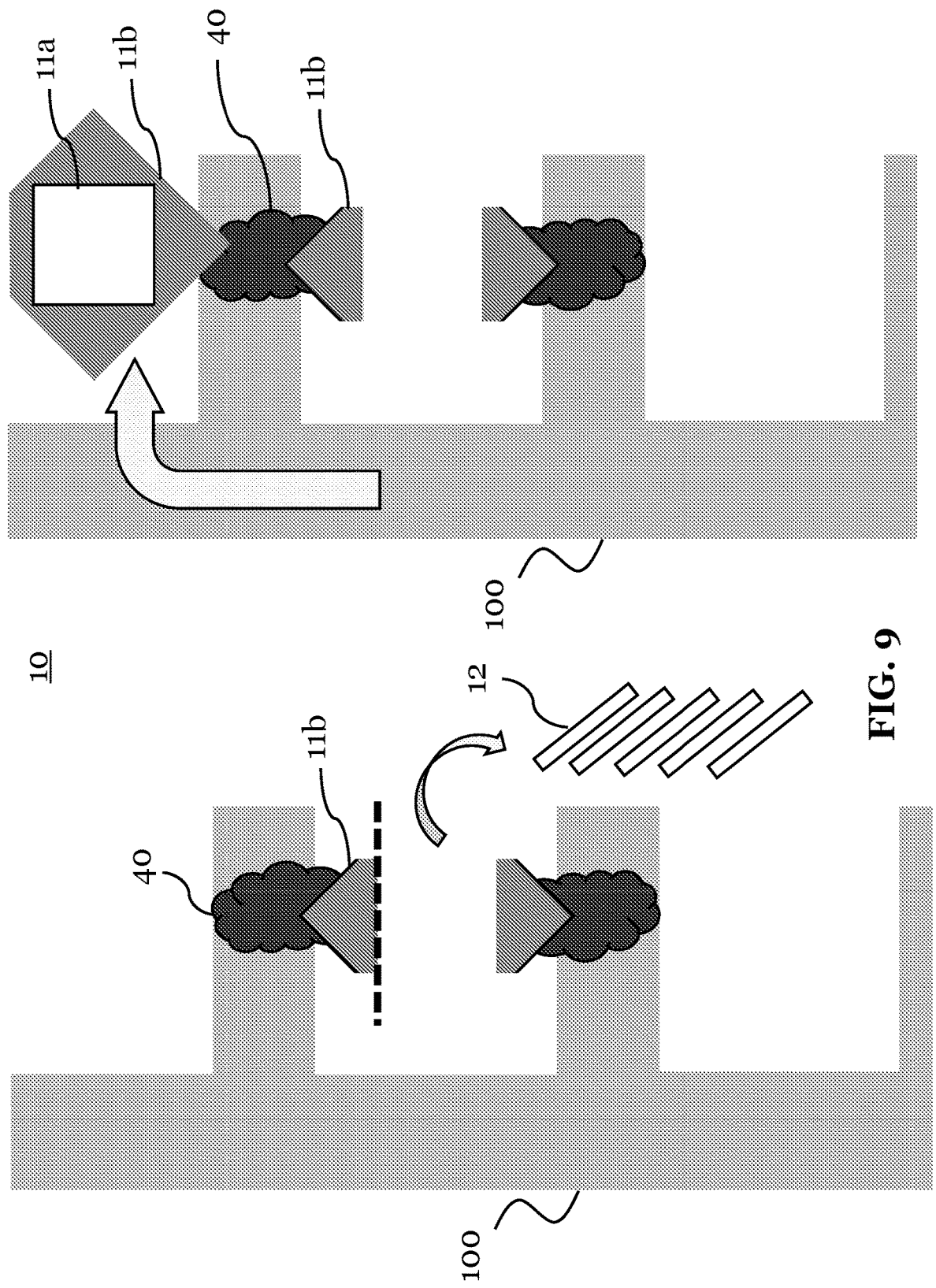
FIG. 9 shows further steps of the exemplary method.

FIG. 7(*a*), FIGS. 8(*a*) and 8(*b*), and FIG. 9(*a*) illustrate the step of slicing 22 the diamond 11*a*. In particular, the slicing 22 may comprises cutting the product 11 with the laser beam 14 along a third side-face of the diamond 11*a* perpendicular to the first and second side-face, to remove a third graphitized piece. This is shown in FIG. 7, and illustrated by the dashed line indicating the path of the laser beam 14 for the cutting.

Further, the slicing 22 may comprise cutting off one or more slices 12 from the diamond 11*a* with the laser beam 14. Each slice may have a thickness in a range of 0.1-0.4 mm. This is shown in FIG. 7(*b*), FIGS. 8(*a*) and 8(*b*), and FIG. 9(*a*), wherein in total 5 slices are shown to be removed as an example. However, typically, even 10 to 20, for instance 15 slices 12, are cut off from the diamond 11*a*. Each slice 12 may be cut off parallel to the cut along the third side-face, i.e. each slice 12 is also cut parallel to the next slice 12. As shown in FIG. 9(*a*), the last slice 12 may be cut off along a fourth side-face of the diamond 11*a*, which is opposite to the third side-face.

FIG. 9(*b*) shows that after slicing 22 the diamond 11*a*, only the graphitized pieces that are glued to the holder 100 remain. The cored diamond 11*a* is completely sliced into slices 12. Further, it is shown that subsequently, a further CVD diamond product can be cored and sliced. In particular, the method 10 may further comprise coring 21 and slicing 22, one after the other, each of one or more further products in the same manner as the CVD product 11 cored and sliced first. To this end, the multiple CVD products 11 may be held in a specific holder 100 described next.

Figure 10:
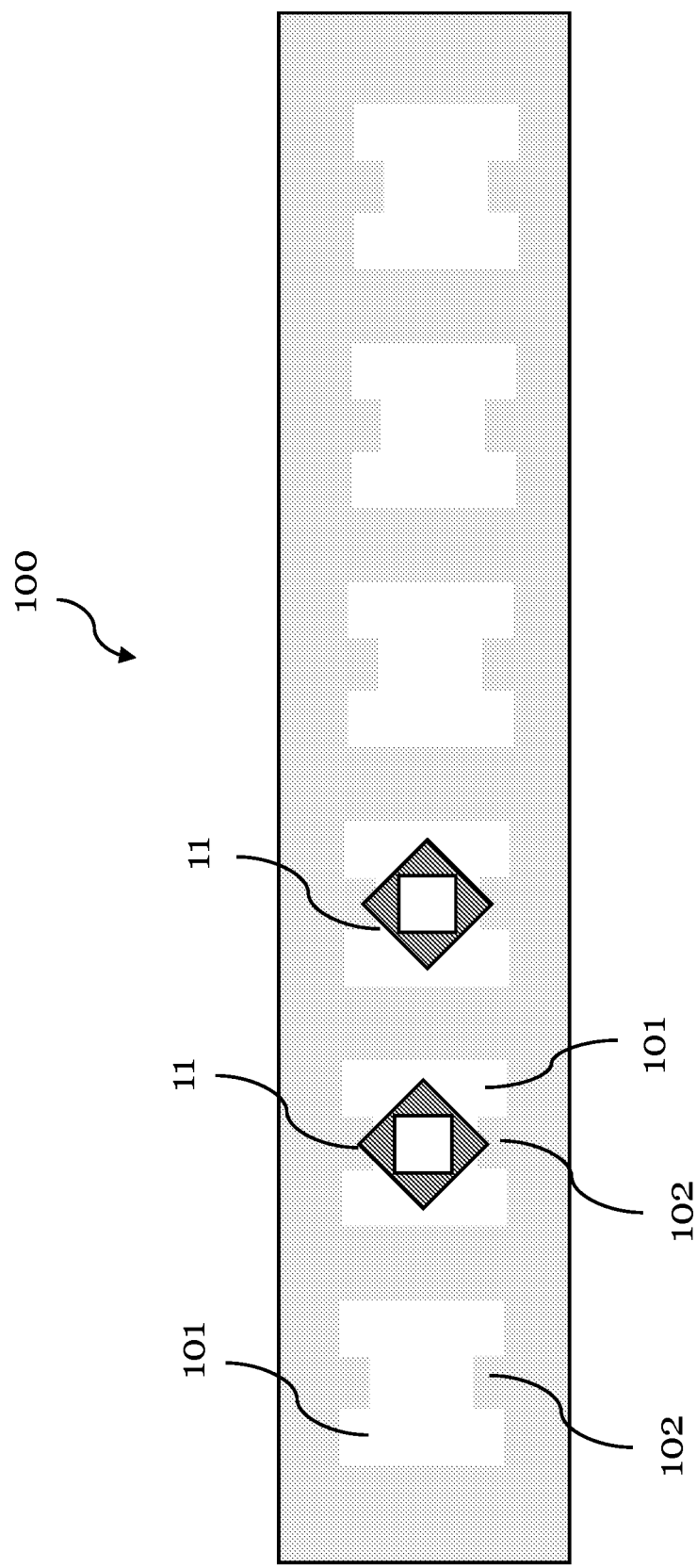
FIG. 10 shows a holder for CVD diamond products used in a method according to an embodiment of the invention.

FIG. 10 illustrates the holder 100, which may be part of the apparatus 30, and/or may be easily attachable to and detachable from the rotatable element 131 of the apparatus 30. The holder 100 is configured to the multiple CVD diamond products 11, particularly arranged one after the other in a determined direction. For instance, as shown, the holder 100 may comprise an elongated metal piece and a plurality of holding sections arranged along the holder 100 in the determined direction, wherein a CVD product 11 is held in each holding section. As an example, each holding section may comprise a cutout 101 of the metal sheet, and one or more attachment pieces 102, e.g. protruding into each cutout 101, for attaching, in particular gluing 40, a CVD diamond product 11. Thereby, the product 11 becomes positioned within the cutout 101. Notably, as already mentioned above, the holder 100 is only attached to graphitized material 11*b*.

Figure 11:
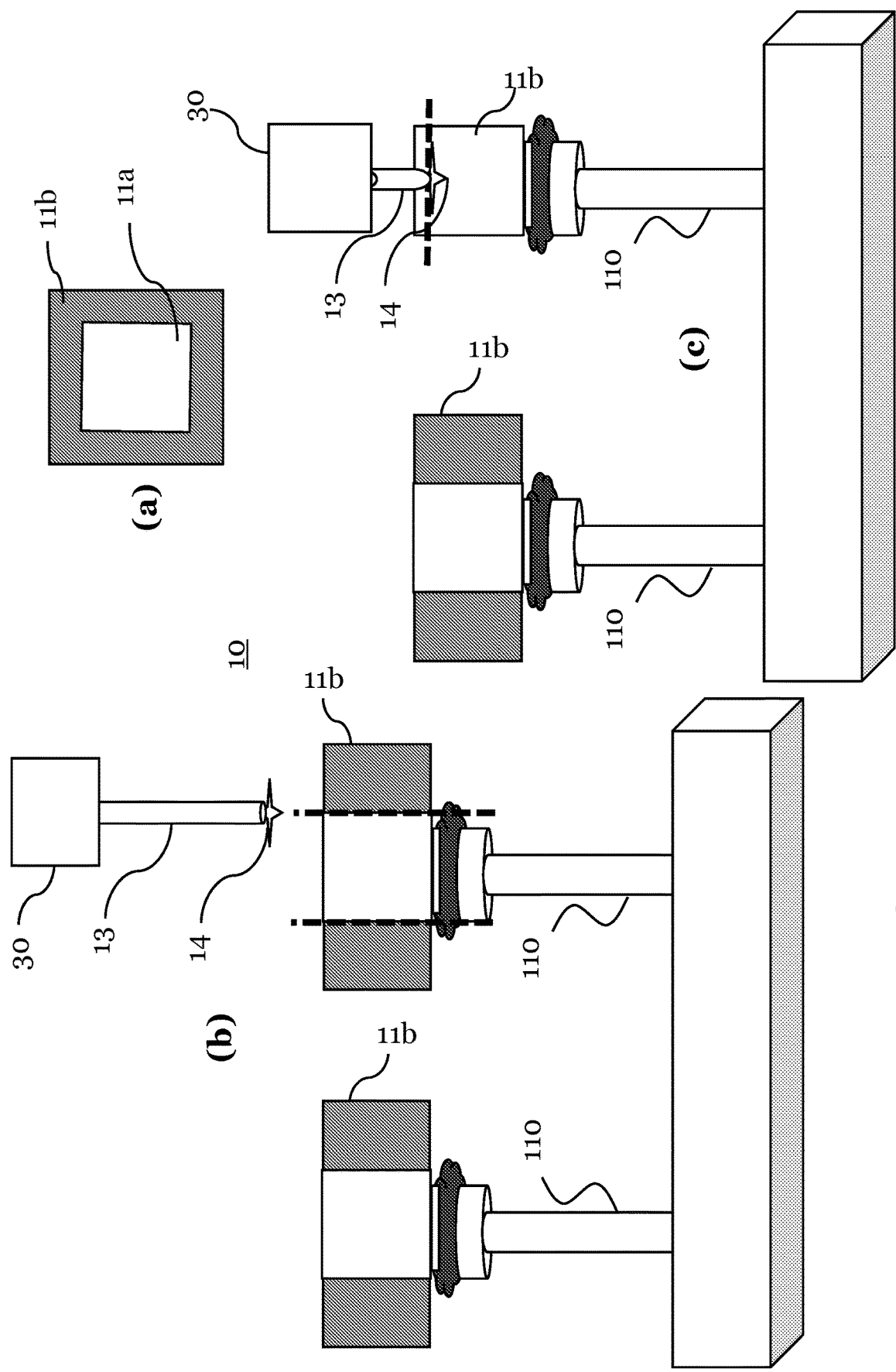
FIG. 11 shows an alternative CVD diamond product type and an alternative holder and exemplary method

FIG. 11 illustrates another exemplary method 10 according to an embodiment of the invention, which can be carried out with the apparatus 30 shown in FIG. 3.

In particular, FIG. 11 shows in (a) a CVD diamond product 11, which comprises the diamond 11 and the graphitized material 11b. In this exemplary CVD diamond product 11, the graphitized material 11b is deposited parallel to the side-faces of the diamond 11.

Further, FIG. 11 shows in (b) and (c) the exemplary method 10 for coring and slicing the product 11 shown in (a). The apparatus 30 used for the coring and slicing of the product 11 comprises one or more dop holders 110. Two dop holders 110 are exemplarily shown, but the apparatus 30 can have multiple (more than two) dop holder. Each dop holder 110 may hold one product 11, so that multiple products 11 may be processed (for coring and slicing) one after the other. Each product 11 may be attached to the respective dop holder 110 with its top-face or with its bottom-face (on which there is no thick graphitized material). Each dop holder 110 may comprise an elongated shaft, and each dop holder 110 may be configured to rotate around an axis running along the elongation of that shaft. That is, each dop holder 110 may rotate about itself.

FIG. 11 shows in (a) that first the graphitized material 11b can be removed from the side-faces of the diamond 11 by cutting with the laser beam 14 guided in the fluid jet 13. The cutting may be performed parallel to the respective side-face, as shown. After each cut, the respective dop holder 110 may be rotated to prepare for the next cut, e.g., may be rotated by 90° around the axis.

FIG. 11 shows further in (b) that then the cored diamond 11a may be sliced with the laser beam 14, by cutting parallel to its top-face or bottom-face (depending on whether the top-face or bottom-face of the diamond 11a is attached to the dop holder 110). That is, the slicing may be performed parallel to a diamond seed surface.

The method 10 of FIG. 11 can thereby be performed with the same parameters (laser beam 14, fluid jet 13, displacement speed, etc.) as described for the methods 10 of FIG. 2 or FIGS. 4-9.

The present disclosure has been described in conjunction with various embodiments as examples as well as implementation forms. However, other variations can be understood and effected by those persons skilled in the art and practicing the claimed embodiments, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method (10) for coring (21) and slicing (22) a Chemical Vapor Deposition, CVD, diamond product (11), the product (11) comprising a diamond (11a) and graphitized material (11b) covering a plurality of side-faces of the diamond (11a), wherein the method (10) is performed by an apparatus (30) providing a laser beam (14) coupled into a pressurized fluid jet (13), and wherein the method (10) comprises:
for the coring (21), cutting the product (11) with the laser beam (14) to remove the graphitized material (11b) from the side-faces of the diamond (11a);
for the slicing (22), cutting off one or more slices (12) from the diamond (11a) with the laser beam (14).

2. The method (10) according to claim 1, wherein:
the product (11) is positioned into a first orientation for the coring (21), and the diamond (11a) is positioned into at least a second orientation for the slicing (22).

3. The method (10) according to claim 2, further comprising:
measuring a surface orientation of a top and/or bottom face of the diamond (11a); and
determining the second orientation for the slicing and/or a slicing direction, based on the measured surface orientation.

4. The method (10) according to claim 2, wherein:
the first orientation for the coring (21) is the same as the second orientation for the slicing (22); or
the second orientation for the slicing (22) is tilted by 5-20° with respect to the first orientation for the coring (21); or
the second orientation for the slicing (22) is turned by 90° with respect to the first orientation for the coring.

5. The method according to claim 2, wherein:
the slicing comprises positioning the product (11) into the second orientation for initializing the cut for a set of slices from the diamond (11a), and turning the product by 180° for finishing the cutting off of the set of slices from the diamond (11a).

6. The method (10) according to claim 2, further comprising:
trimming (23) the CVD diamond product (11), by cutting the diamond (11a) with the laser beam (14) parallel to its top-face and/or its bottom-face;
wherein the product (11) is positioned into a third orientation for the trimming (23).

7. The method (10) according to claim 6, wherein the method (10) comprises:
for the coring (21):
cutting the product (11) with the laser beam (14) along a first side-face of the diamond (11a), to remove a first graphitized piece; and
cutting the product with the laser beam (14) along a second side-face of the diamond (11a) opposite the first side-face, to remove a second graphitized piece;
for the trimming (23), after the coring (21):
repositioning the product (11) into the third orientation;
cutting the diamond (11a) with the laser beam (14) parallel to its top-face, and cutting the diamond (11a) with the laser beam (14) parallel to its bottom-face;
for the slicing (22), after the trimming (23):
repositioning the product (11) into the second orientation;
cutting the product (11) with the laser beam (14) along a third side-face of the diamond (11a) perpendicular to the first and second side face, to remove a third graphitized piece; and
cutting off one or more slices (12) from the diamond (11a) with the laser beam (14), wherein each slice (12) is cut off parallel to the cut along the third side-face, and wherein the last slice (12) is cut off along a fourth side-face of the diamond (11a) opposite to the third side-face.

8. The method (10) according to claim 6, further comprising:
rotating the product (11) from the first orientation for the coring (21) by about 90° into the third orientation for the trimming (23); and rotating the product back from the third orientation for the trimming (23) by the about 90° into the second orientation for the slicing (22) or keeping the third orientation for the slicing (22).

9. The method (10) according to claim 6, wherein:
trimming (23) the product (11) comprises cutting the top-face and the bottom-face of the diamond (11a) such that all faces of the diamond (11a) have a determined dimension and orientation.

10. The method according to claim 1, wherein:
the slicing comprises cutting off the one or more slices (12) from the diamond (11a) parallel to its top face and/or its bottom face.

11. The method (10) according to claim 1, further comprising:
coring (21) and slicing (22), one after the other, each of one or more further products in the same manner as the product (11).

12. The method (10) according to claim 1, wherein:
the method (10) is performed automatically and/or seamlessly by the apparatus (30); and/or the method (10) is performed by the apparatus (30) in a single process.

13. The method (10) according to claim 1, wherein:
an average surface roughness of a cut surface of a slice (12) is in a range of 200-600 nm.

14. The method (10) according to claim 1, wherein:
a kerf produced by cutting with the laser beam (14) is in a range of 25-100 μm; and/or a taper produced by cutting with the laser beam (14) is in a range of 1-2°.

15. The method (10) according to claim 1, wherein:
cutting the diamond (11a) comprises cutting along a determined crystallographic orientation of the diamond (11a).

16. The method (10) according to claim 1, wherein:
the laser beam (14) is pulsed, and
a pulse intensity of the laser beam (14) in the fluid jet (13) is in a range of 0.8-2.0 $GW/cm^2$, and/or
an average power of the laser beam (14) is in a range of 20-300 W, and a pulse length of the laser beam (14) is in a range of 150-400 ns.

17. The method (10) according to claim 1, further comprising:
receiving, by the apparatus (30) during the cutting of the product (11), a laser-induced electromagnetic radiation, propagating away from the product (11);
converting the received radiation into a signal; and
determining whether the laser beam (14) has broken through the product (11) based on the signal.

18. The method (10) according to claim 17, wherein:
the laser-induced electromagnetic radiation is received by the apparatus (30) through the fluid jet (13).

19. An apparatus (30) for coring (21) and slicing (22) a Chemical Vapor Deposition, CVD, diamond product (11) comprising a diamond (11a) and graphitized material (11b) covering a plurality of side-faces of the diamond (11a):
a machining unit (31) configured to provide a laser beam (14) coupled into a pressurized fluid jet (13); and
a control unit (32) configured to control the machining unit (31) to:
for the coring (21), cut the product (11) with the laser beam (14) to remove the graphitized material (11b) from the side-faces of the diamond (11a);
for the slicing (22), cut off one or more slices (12) from the diamond (11a) with the laser beam (14).

20. The apparatus (30) according to claim 19, wherein:
the control unit (32) is further configured to position the product (11) into a first orientation for the coring (21), and position the diamond (11a) into at least a second orientation for the slicing (22).

21. The apparatus (30) according to claim 19, wherein the control unit (32) is further configured to control the machining unit (31) to:
trim (23) the CVD diamond product (11), by cutting the diamond (11a) with the laser beam (14) parallel to its top-face and/or its bottom-face;
wherein the product (11) is positioned into a third orientation for the trimming (23).

22. The apparatus (30) according to claim 21, wherein the control unit (32) is configured to control the machining unit (31) to:
for the coring (21):
cut the product (11) with the laser beam (14) along a first side-face of the diamond (11a), to remove a first graphitized piece;
cut the product (11) with the laser beam (14) along a second side-face of the diamond (11a) opposite the first side-face, to remove a second graphitized piece;
for the trimming (23), after the coring (21):
reposition the product (11) into the third orientation;
cut the diamond (11a) with the laser beam (14) parallel to its top face, and cut the diamond (11a) with the laser beam (14) parallel to its bottom face;
for the slicing (22), after the trimming (23):
reposition the product (11) into the second orientation;
cut the product (11) with the laser beam (14) along a third side-face of the diamond (11a) perpendicular to the first and second side-face, to remove a third graphitized piece; and
cut off one or more slices (12) from the diamond (11a) with the laser beam (14), wherein each slice (12) is cut off parallel to the cut along the third side-face, and wherein the last slice (12) is cut off along a fourth side-face of the diamond (11a) opposite to the third side face.

23. The apparatus (30) according to claim 19, further comprising:
a holder (100, 110) configured to hold multiple CVD diamond products (11) arranged one after the other in a determined direction.

24. The apparatus (30) according to claim 23, wherein:
the holder (100) comprises an elongated metal piece and a plurality of holding sections arranged along the holder (100) in the determined direction,
wherein each holding section comprises a cutout (101) of the metal piece and one or more attachment pieces (102) for attaching a product (11) such that the product (11) is positioned within the cutout (101) with a determined orientation.

25. The apparatus (30) according to claim 23, wherein:
the holder (100) is only attached to graphitized material (11b) during the entire coring (21) and slicing (22) of the product (11).

26. The apparatus (30) according to claim 23, wherein:
the machining unit (31) comprises a rotatable element (131), and
the holder (100) is easily attachable to and detachable from the rotatable element (131).

27. The apparatus (30) according to claim 19, further comprising:
an optical sensor (33a) configured to determine, during the cutting of the product (11), whether the laser beam (14) has broken through the product (11).

28. The apparatus (30) according to claim 27, wherein:
the optical sensor (33*a*) is configured to receive a laser-induced electromagnetic radiation propagating away from the product (11); to convert the received radiation into a signal; and to determine whether the laser beam (14) has broken through the product (11) based on the signal;
wherein the optical sensor (33*a*) is arranged to receive the radiation through the fluid jet (13).

29. The apparatus (30) according to claim 20, further comprising:
a distance sensor (33*b*) configured to measure a surface orientation of a top and/or bottom face of the diamond (11*a*); and
the control unit (32) is configured to determine the second orientation for the slicing and/or a slicing direction, based on the measured surface orientation.

30. A computer program comprising a program code for performing the method (10) according to claim 1, wherein the program code is executed by the apparatus (30).

31. A computer program comprising a program code for controlling the control unit (32) of the apparatus (30) according to claim 19, wherein
the program code is executed by the control unit (32), and the control unit (32) is configured to control the machining unit (31) to:
for the coring (21), cut the product (11) with the laser beam (14) to remove the graphitized material (11*b*) from the side-faces of the diamond (11*a*);
for the slicing (22), cut off one or more slices (12) from the diamond (11*a*) with the laser beam (14).

* * * * *